(12) United States Patent
Ito et al.

(10) Patent No.: US 9,689,491 B2
(45) Date of Patent: Jun. 27, 2017

(54) CONTROLLER FOR VEHICLE POWER TRANSMISSION SYSTEM

(71) Applicant: TOYOTA JIDOSHA KABUSHIKI KAISHA, Toyota-shi, Aichi-ken (JP)

(72) Inventors: Akihide Ito, Nagoya (JP); Daisuke Inoue, Toyota (JP); Mitsuhiro Fukao, Toyota (JP); Kenji Matsuo, Toyota (JP); Hiroki Kondo, Miyoshi (JP); Motonori Kimura, Toyota (JP); Kazuya Sakamoto, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/056,063

(22) Filed: Feb. 29, 2016

(65) Prior Publication Data

US 2016/0258531 A1  Sep. 8, 2016

(30) Foreign Application Priority Data

Mar. 3, 2015  (JP) .................................. 2015-041863

(51) Int. Cl.
*F16H 61/12* (2010.01)
*F16H 9/18* (2006.01)
*F16H 37/06* (2006.01)
*F16H 61/662* (2006.01)
*F16H 37/02* (2006.01)

(52) U.S. Cl.
CPC .............. *F16H 61/12* (2013.01); *F16H 9/18* (2013.01); *F16H 37/06* (2013.01); *F16H 61/662* (2013.01); *F16H 37/022* (2013.01); *F16H 2061/1224* (2013.01); *F16H 2061/1288* (2013.01)

(58) Field of Classification Search
None
See application file for complete search history.

(56) References Cited

U.S. PATENT DOCUMENTS

| 6,533,702 | B1 * | 3/2003 | Asyama | F16H 61/66254 477/45 |
| 2010/0255941 | A1 * | 10/2010 | Ogata | F16H 61/0206 474/17 |
| 2015/0087463 | A1 | 3/2015 | Nakagawa et al. | |

FOREIGN PATENT DOCUMENTS

| JP | 2002-267008 A | 9/2002 |
| JP | 2009-270690 A | 11/2009 |
| WO | 2013/176208 A1 | 11/2013 |

\* cited by examiner

*Primary Examiner* — Erin D Bishop
(74) *Attorney, Agent, or Firm* — Oliff PLC (57) ABSTRACT

When there is a failure in a speed ratio control linear solenoid valve, or the like, a controller for a vehicle power transmission system establishes a state where torque is transmitted via a gear mechanism, and, in this state, determines whether the speed ratio control linear solenoid valve, or the like, has returned to a normal state by comparing a target speed ratio and actual speed ratio of a continuously variable transmission with each other. It is determined whether the speed ratio control linear solenoid valve, or the like, has returned to the normal state by changing the target speed ratio of the belt-type continuously variable transmission and then comparing the target speed ratio with the actual speed ratio. Thus, when the speed ratio control linear solenoid valve, or the like, has returned from a fail-safe state to the normal state, a feeling of strangeness of a driver is suppressed.

6 Claims, 6 Drawing Sheets

FIG. 5A
<$P_{SLP}$ CHARACTERISTICS>

FIG. 5B
<$P_{SLP}$-Pin CHARACTERISTICS>

FIG. 6A
<$P_{SLS}$ CHARACTERISTICS>

FIG. 6B
<$P_{SLS}$-Pd CHARACTERISTICS>

CONTROLLER FOR VEHICLE POWER TRANSMISSION SYSTEM

INCORPORATION BY REFERENCE

The disclosure of Japanese Patent Application No. 2015-041863 filed on Mar. 3, 2015 including the specification, drawings and abstract is incorporated herein by reference in its entirety.

BACKGROUND OF THE INVENTION

1. Field of the Invention

The invention relates to a controller for a vehicle power transmission system and, more particularly, to improvement for suppressing a feeling of strangeness that is experienced by a driver at the time of a return from a fail-safe state.

2. Description of Related Art

There is known a vehicle power transmission system in which a gear mechanism and a belt-type continuously variable transmission including an input-side sheave and an output-side sheave are provided in parallel with each other in power transmission paths between an input shaft and an output shaft. The vehicle power transmission system includes a switching mechanism that selectively establishes one of a first transmission path and a second transmission path. The first transmission path is a path through which torque input from the input shaft is transmitted to the output shaft via the belt-type continuously variable transmission. The second transmission path is a path through which torque input from the input shaft is transmitted to the output shaft via the gear mechanism. The vehicle power transmission system described in International Application Publication No. 2013/176208 is an example of the above vehicle power transmission system.

However, International Application Publication No. 2013/176208 does not describe anything about a fail-safe technique in the event of a failure of a hydraulic pressure output device that controls hydraulic pressure that is output to the input-side sheave.

SUMMARY OF THE INVENTION

The invention provides a controller for a vehicle power transmission system, which suppresses a feeling of strangeness that is experienced by a driver at the time of a return from a fail-safe state.

An aspect of the invention provides a controller for a vehicle power transmission system. In the vehicle power transmission system, a gear mechanism and a belt-type continuously variable transmission including an input-side sheave and an output-side sheave are provided in parallel with each other in power transmission paths between an input shaft and an output shaft. The vehicle power transmission system includes a switching mechanism that selectively establishes any one of a first transmission path and a second transmission path. The first transmission path is a path through which torque input from the input shaft is transmitted to the output shaft via the belt-type continuously variable transmission. The second transmission path is a path through which torque input from the input shaft is transmitted to the output shaft via the gear mechanism. The controller includes an actual speed ratio calculation unit, a target speed ratio setting unit, a hydraulic pressure output device and a normal state return determination unit. The actual speed ratio calculation unit is configured to calculate an actual speed ratio in the belt-type continuously variable transmission. The target speed ratio setting unit is configured to set a target speed ratio of the belt-type continuously variable transmission. The hydraulic pressure output device is configured to control hydraulic pressure that is output to the input-side sheave based on the target speed ratio. The normal state return determination unit is configured to, when there is a failure in the hydraulic pressure output device, establish a state where torque is transmitted through the second transmission path, and determine whether the hydraulic pressure output device has returned to a normal state by comparing the target speed ratio and actual speed ratio of the belt-type continuously variable transmission with each other in the state where torque is transmitted through the second transmission path.

With the above-described controller, the actual speed ratio calculation unit that calculates the actual speed ratio in the belt-type continuously variable transmission, the target speed ratio setting unit that sets the target speed ratio of the belt-type continuously variable transmission, the hydraulic pressure output device that controls hydraulic pressure that is output to the input-side sheave based on the target speed ratio, and the normal state return determination unit that, when there is a failure in the hydraulic pressure output device, establishes a state where torque is transmitted through the second transmission path and, in this state, determines whether the hydraulic pressure output device has returned to the normal state by comparing the target speed ratio and actual speed ratio of the belt-type continuously variable transmission with each other are provided. Therefore, it is possible to determine whether the hydraulic pressure output device has returned to the normal state, and the determination is carried out in the state where torque is transmitted through the second transmission path, so, even when torque fluctuations occur as a result of a shift of the belt-type continuously variable transmission, torque is not transmitted to an output side through the first transmission path. Thus, it is possible to suppress a feeling of strangeness that is experienced by a driver. That is, it is possible to suppress a feeling of strangeness that is experienced by the driver at the time of a return from a fail-safe state.

In the controller, the normal state return determination unit may be configured to, when there is a failure in the hydraulic pressure output device, (i) establish the state where torque is transmitted through the second transmission path, and (ii) determine whether the hydraulic pressure output device has returned to the normal state by changing the target speed ratio of the belt-type continuously variable transmission in the state where torque is transmitted through the second transmission path and then comparing the target speed ratio with the actual speed ratio. With this controller, when the hydraulic pressure output device has returned to the normal state, it is possible to suppress a feeling of strangeness that is experienced by a driver due to a change in the speed ratio of the belt-type continuously variable transmission.

In the controller, the normal state return determination unit may be configured to, when there is a failure in the hydraulic pressure output device, (i) establish the state where torque is transmitted through the second transmission path, and (ii) prohibit switching from the state where torque is transmitted through the second transmission path to a state where torque is transmitted through the first transmission path. With this controller, it is possible to suppress frequent occurrence of switching between the state where torque is transmitted through the first transmission path and the state where torque is transmitted through the second transmission path, so it is possible to further suitably suppress a feeling of strangeness that is experienced by a driver.

In the controller, the normal state return determination unit may be configured to, after it is determined that the hydraulic pressure output device has returned to the normal state, when it is determined that a traveling state is a state where the state where torque is transmitted through the second transmission path should be established, cancel prohibition of switching from the state where torque is transmitted through the second transmission path to the state where torque is transmitted through the first transmission path. In the vehicle power transmission system, because the state where torque is transmitted through the second transmission path is established at a vehicle speed higher than a normal gear driving region, there is a concern that the torque transmission state is switched to the state where torque is transmitted through the first transmission path immediately after the hydraulic pressure output device has returned to the normal state and, as a result, the driver experiences a feeling of strangeness. With the above-described controller, by cancelling prohibition of switching to the state where torque is transmitted through the first transmission path on the condition that the traveling state falls within the normal gear driving region, it is possible to further suitably suppress a feeling of strangeness that is experienced by a driver.

In the controller, the normal state return determination unit may be configured to, when it is determined that there is a failure in the hydraulic pressure output device, (i) establish a neutral state in the vehicle power transmission system, and (ii) at the time when a vehicle speed becomes lower than or equal to a prescribed value, establish the state where torque is transmitted through the second transmission path. If the torque transmission state is switched to the state where torque is transmitted through the second transmission path at a relatively high vehicle speed, rapid deceleration occurs in the vehicle. With the above-described controller, because the neutral state is established in the vehicle power transmission system, occurrence of rapid deceleration is suppressed, so it is possible to further suitably suppress a feeling of strangeness that is experienced by a driver.

In the controller, the prescribed value may be a vehicle speed higher than a vehicle speed that is used as a criterion to switch from a state where torque is transmitted through the first transmission path to the state where torque is transmitted through the second transmission path in the case where it is not determined that there is a failure in the hydraulic pressure output device. With setting of the prescribed value in the above-described controller, it is determined whether to switch to the state where torque is transmitted through the second transmission path based on the vehicle speed higher than the vehicle speed that is used as a criterion to determine the change. Therefore, in the vehicle power transmission system, it is possible to promptly establish the state where torque is transmitted through the second transmission path, so it is possible to quickly shift into retreat traveling.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In the invention, suitably, the hydraulic pressure output device is a linear solenoid valve that controls hydraulic pressure that is output to the input-side sheave in response to a control signal that is supplied from the controller. Suitably, when there is an ON failure in the linear solenoid valve, the state where torque is transmitted through the second transmission path is established, and it is determined whether the hydraulic pressure output device has returned to a normal state based on the target speed ratio and actual speed ratio of the belt-type continuously variable transmission in the state where torque is transmitted through the second transmission path.

Hereinafter, an embodiment of the invention will be described in detail with reference to the accompanying drawings. In the drawings that are used in the following description, the scale ratio, and the like, of each portion are not always accurately drawn.

Figure 1:
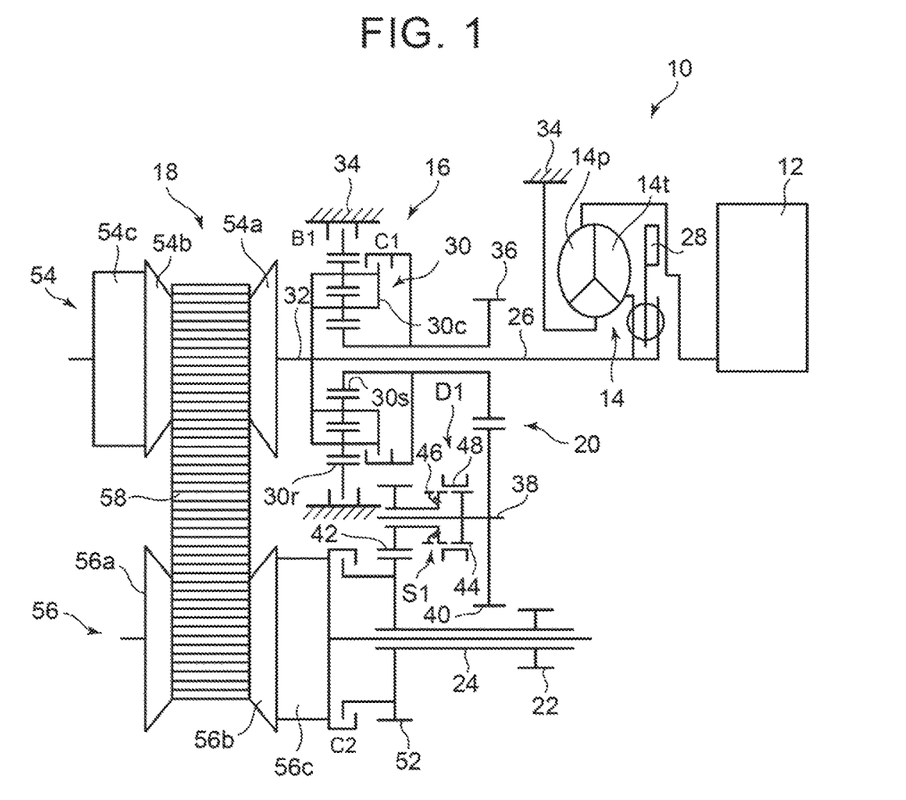
FIG. 1 is a skeletal view that schematically shows a vehicle power transmission system to which the invention is suitably applied.

FIG. 1 is a skeletal view that schematically shows the configuration of a vehicle power transmission system 10 (hereinafter, simply referred to as power transmission system 10) to which the invention is suitably applied. As shown in FIG. 1, the power transmission system 10 according to the present embodiment, for example, includes an engine 12, a torque converter 14, a forward/reverse switching device 16, a belt-type continuously variable transmission 18 (hereinafter, simply referred to as continuously variable transmission 18), a gear mechanism 20 and an output shaft 24. The engine 12 is used as a driving force source for propelling the vehicle. The torque converter 14 is a fluid transmission device. The output shaft 24 includes an output gear 22 that is able to transmit power to drive wheels (not shown). Torque (driving force) generated by the engine 12 is transmitted to a turbine shaft via the torque converter 14, and is input to an input shaft 32. The input shaft 32 is configured to rotate integrally and coaxially with the turbine shaft 26.

The power transmission system 10 includes the continuously variable transmission 18 and the gear mechanism 20 that are provided in parallel with each other in power transmission paths between the input shaft 32 and the output shaft 24. That is, in the power transmission system 10, any one of a first transmission path and a second transmission path is configured to be selectively established, and the torque transmission path is switched in response to a traveling state of the vehicle. Torque transmitted to the input shaft 32 is transmitted to the output shaft 24 via the continuously variable transmission 18, and the like, through the first transmission path. Torque transmitted to the input shaft 32 is transmitted to the output shaft 24 via the gear mechanism 20, and the like, through the second transmission path.

The engine 12 is, for example, an internal combustion engine, such as a gasoline engine and a diesel engine, and generates torque (driving force) for propelling the vehicle to which the power transmission system 10 is applied. The torque converter 14 includes a pump impeller 14p and a turbine runner 14t. The pump impeller 14p is coupled to a crankshaft of the engine 12. The turbine runner 14t is coupled to the forward/reverse switching device 16 via the turbine shaft 26 corresponding to an output-side member of the torque converter 14. The torque converter 14 is configured to transmit power via fluid. A lockup clutch 28 is provided between the pump impeller 14p and the turbine runner 14t. When the lockup clutch 28 is completely engaged, the pump impeller 14p and the turbine runner 14t are integrally rotated.

The forward/reverse switching device 16 is mainly formed of a forward clutch C1, a reverse brake B1 and a double-pinion-type planetary gear 30. A carrier 30c of the planetary gear 30 is coupled to the input shaft 32 (turbine shaft 26) so as to be integrally rotated with the input shaft 32 (turbine shaft 26). A ring gear 30r of the planetary gear 30 is selectively coupled to a housing 34 via the reverse brake B1. The housing 34 serves as a non-rotating member. A sun gear 30s and the carrier 30c are selectively coupled to each other via the forward clutch C1. Each of the forward clutch C1 and the reverse brake B1 is a hydraulic engagement device of which an engagement state is controlled by a hydraulic actuator. Suitably, each of the forward clutch C1 and the reverse brake B1 is a hydraulic friction engagement device that is frictionally engaged.

The sun gear 30s of the planetary gear 30 is coupled to a small-diameter gear 36 that constitutes the gear mechanism 20. The gear mechanism 20 includes a plurality of gear pairs (gear trains), and is a mechanism that transmits power, input from the small-diameter gear 36, to the output shaft 24 via the plurality of gear pairs. The gear mechanism 20 includes a large-diameter gear 40 provided on a counter shaft 38 so as to be relatively non-rotatable. The small-diameter gear 36 and the large-diameter gear 40 are in mesh with each other. An idler gear 42 is provided coaxially with the counter shaft 38 so as to be relatively rotatable with respect to the counter shaft 38. A dog clutch D1 is provided between the counter shaft 38 and the idler gear 42. The dog clutch D1 includes a first gear 44, a second gear 46 and a sleeve 48. The first gear 44 is integrally rotated with the counter shaft 38. The second gear 46 is integrally rotated with the idler gear 42. The sleeve 48 includes a groove portion that is fittable (engageable, meshable) with the first gear 44 and the second gear 46. When the sleeve 48 is fitted to the first gear 44 and the second gear 46, the counter shaft 38 and the idler gear 42 are connected to each other and are integrally rotated. The dog clutch D1 includes a synchromesh mechanism S1 that serves as a synchronization mechanism. The synchromesh mechanism S1 synchronizes rotations at the time of fitting the sleeve 48.

The idler gear 42 is in mesh with an input gear 52 having a larger diameter than the idler gear 42. The input gear 52 is provided so as to be relatively non-rotatable with respect to the output shaft 24. The output shaft 24 is arranged coaxially with the rotation axis of a secondary pulley 56 of the continuously variable transmission 18. The output shaft 24 is arranged so as to be rotatable around the rotation axis of the secondary pulley 56. The input gear 52 and the output gear 22 are provided on the output shaft 24 so as to be relatively non-rotatable. Thus, the forward clutch C1, the reverse brake B1 and the dog clutch D1 are provided in the second transmission path through which torque generated by the engine 12 is transmitted from the turbine shaft 26 (input shaft 32) to the output shaft 24 via the gear mechanism 20. When at least one of the forward clutch C1 and the dog clutch D1 is released, the second transmission path is interrupted, and torque is not transmitted from the gear mechanism 20 to the output shaft 24.

A belt driving clutch C2 is interposed in a power transmission path between the continuously variable transmission 18 and the output shaft 24. The belt driving clutch C2 selectively couples the continuously variable transmission 18 to the output shaft 24. When the belt driving clutch C2 is engaged, the first transmission path through which torque generated by the engine 12 is transmitted to the output shaft 24 via the input shaft 32 and the continuously variable transmission 18 is established. When the belt driving clutch C2 is released, the first transmission path is interrupted, and torque is not transmitted from the continuously variable transmission 18 to the output shaft 24. In the present embodiment, the forward clutch C1, the dog clutch D1, the belt driving clutch C2 and the reverse brake B1 correspond to a switching mechanism.

The continuously variable transmission 18 is provided in a power transmission path between the output shaft 24 and the input shaft 32 coupled to the turbine shaft 26. The continuously variable transmission 18 includes a primary pulley 54, the secondary pulley 56 and a transmission belt 58. The primary pulley 54 is an input-side member provided on the input shaft 32 side, and has a variable effective diameter. The secondary pulley 56 is an output-side member, and has a variable effective diameter. The transmission belt 58 is wound around the primary pulley 54 and the secondary pulley 56 so as to span between the primary pulley 54 and the secondary pulley 56. The continuously variable transmission 18 is a continuously variable transmission mechanism that transmits power via friction force between the transmission belt 58 and each of the primary pulley 54 and the secondary pulley 56.

The primary pulley 54 includes a fixed sheave 54a, a movable sheave 54b and a primary hydraulic actuator 54c. The fixed sheave 54a is coaxially connected to the input shaft 32, and serves as an input-side fixed rotor. The movable sheave 54b is provided so as to be relatively non-rotatable around its axis and movable in the axial direction with respect to the input shaft 32, and serves as an input-side movable rotor. The primary hydraulic actuator 54c generates thrust for moving the movable sheave 54b in order to change the V-groove width between the fixed sheave 54a and the movable sheave 54b. The secondary pulley 56 includes a fixed sheave 56a, a movable sheave 56b and a secondary hydraulic actuator 56c. The fixed sheave 56a serves as an output-side fixed rotor. The movable sheave 56b is provided so as to be relatively non-rotatable around its axis and movable in the axial direction with respect to the fixed sheave 56a, and serves as an output-side movable rotor. The secondary hydraulic actuator 56c generates thrust for moving the movable sheave 56b in order to change the V-groove width between the fixed sheave 56a and the movable sheave 56b. In the present embodiment, the primary pulley 54 corresponds to an input-side sheave, and the secondary pulley 56 corresponds to an output-side sheave.

In the continuously variable transmission 18, when the winding diameter (effective diameter) of the transmission belt 58 is changed as a result of a change in the V-groove width of the primary pulley 54, a speed ratio (gear ratio) γ (=Input shaft rotation speed Nin/Output shaft rotation speed Nout) is continuously changed. For example, when the V-groove width of the primary pulley 54 is reduced, the speed ratio γ decreases. That is, the continuously variable transmission 18 is upshifted. When the V-groove width of the primary pulley 54 is increased, the speed ratio γ increases. That is, the continuously variable transmission 18 is downshifted. In the power transmission system 10, when the second transmission path through which torque transmitted to the input shaft 32 is transmitted to the output shaft 24 via the gear mechanism 20, and the like, is established as well, it is possible to independently control the speed ratio γ of the continuously variable transmission 18.

Figure 2:
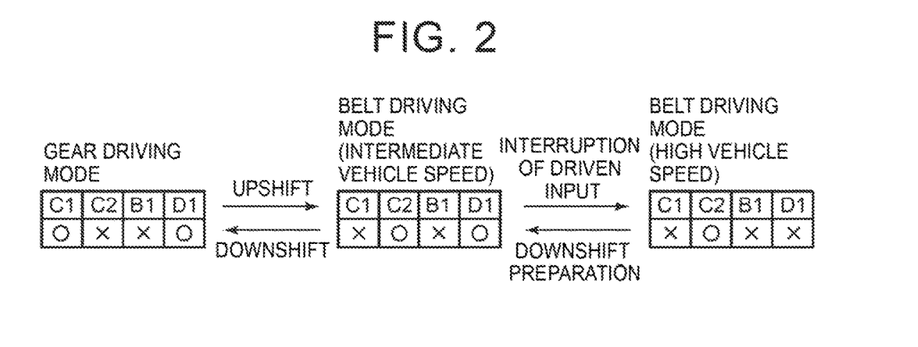
FIG. 2 is a view that illustrates changes in driving pattern of the vehicle power transmission system shown in FIG. 1.

FIG. 2 is a view that illustrates changes in driving pattern of the power transmission system 10 in the present embodiment configured as described above, and is an engagement chart of engagement elements for each driving pattern. In FIG. 2, C1 corresponds to the operation state of the forward clutch C1. C2 corresponds to the operation state of the belt driving clutch C2. B1 corresponds to the operation state of the reverse brake B1. D1 corresponds to the operation state of the dog clutch D1. "○" indicates an engaged (connected) state, and "x" indicates a released (disconnected) state. As described above, the dog clutch D1 includes the synchromesh mechanism S1. When the dog clutch D1 is engaged, the synchromesh mechanism S1 operates.

As shown in FIG. 2, when the forward clutch C1 and the dog clutch D1 are engaged (connected) and the belt driving clutch C2 and the reverse brake B1 are released (disconnected), a gear driving mode (forward traveling mode) is established in the power transmission system 10. In this driving pattern, torque generated by the engine 12 is transmitted to the output gear 22 via the gear mechanism 20. That is, the second transmission path through which torque transmitted to the turbine shaft 26 is transmitted to the output shaft 24 via the gear mechanism 20 is established.

In a state where torque is transmitted in the gear driving mode shown in FIG. 2, that is, through the second transmission path, the forward clutch C1 is engaged, so the planetary gear 30 integrally rotates. Thus, the turbine shaft 26 and the small-diameter gear 36 are rotated at the same rotation speed. The small-diameter gear 36 is in mesh with the large-diameter gear 40 provided on the counter shaft 38, so the counter shaft 38 is rotated by the rotation of the small-diameter gear 36. The dog clutch D1 is engaged, and the counter shaft 38 and the idler gear 42 are connected to each other so as to be integrally rotated. In addition, because the idler gear 42 is in mesh with the input gear 52, the input gear 52 is rotated by the rotation of the counter shaft 38, and, by extension, the output shaft 24 and the output gear 22 that are provided integrally with the input gear 52 are rotated. In this way, when the forward clutch C1 and the dog clutch D1 that are provided in the second transmission path are engaged, torque generated by the engine 12 is transmitted to the output shaft 24 and the output gear 22 via the torque converter 14, the forward/reverse switching device 16, the gear mechanism 20, the idler gear 42, and the like.

Although not shown in FIG. 2, when the reverse brake B1 and the dog clutch D1 are engaged (connected) and the belt driving clutch C2 and the forward clutch C1 are released (disconnected), a gear driving mode (reverse traveling mode) is established in the power transmission system 10. In this driving pattern, torque generated by the engine 12 is transmitted to the output gear 22 via the gear mechanism 20. That is, the second transmission path through which torque transmitted to the turbine shaft 26 is transmitted to the output shaft 24 via the gear mechanism 20 is established.

As shown in FIG. 2, when the belt driving clutch C2 is connected and the forward clutch C1, the reverse brake B1 and the dog clutch D1 are disconnected, a belt driving mode (high vehicle speed) is established in the power transmission system 10. In this driving pattern, torque generated by the engine 12 is transmitted to the output gear 22 via the continuously variable transmission 18. That is, the first transmission path through which torque transmitted to the turbine shaft 26 is transmitted to the output shaft 24 via the continuously variable transmission 18, and the like, is established.

In a state where torque is transmitted in the belt driving mode (high vehicle speed) shown in FIG. 2, that is, through the first transmission path, the belt driving clutch C2 is connected, so the secondary pulley 56 and the output shaft 24 are connected to each other. Thus, the secondary pulley 56, the output shaft 24 and the output gear 22 are integrally rotated. Therefore, torque generated by the engine 12 is transmitted to the output gear 22 via the torque converter 14, the input shaft 32, the continuously variable transmission 18, the output shaft 24, and the like. The reason why the dog clutch D1 is released (disconnected) in the belt driving mode (high vehicle speed) shown in FIG. 2 is to suppress a drag of the gear mechanism 20, and the like, in the belt driving mode and suppress high-speed rotation of the gear mechanism 20, and the like, at a relatively high vehicle speed.

The gear driving mode shown in FIG. 2 is selected in a relatively low vehicle speed region. A speed ratio γ1 (Input shaft rotation speed Nin/Output shaft rotation speed Nout) of the second transmission path, that is, the power transmission path through which torque is transmitted via the gear mechanism 20, and the like, is set to a value higher than a maximum speed ratio γmax of the continuously variable transmission 18. That is, the state where the second transmission path through which torque is transmitted via the gear mechanism 20, and the like, is established is a so-called extra-low gear. The driving pattern of the power transmission system 10 is changed in response to determination as to whether to change between the gear driving mode and the belt driving mode based on, for example, a vehicle speed, or the like. In changing the driving pattern from the gear driving mode to the belt driving mode (high vehicle speed) or in changing the driving pattern from the belt driving mode (high vehicle speed) to the gear driving mode, the change is carried out via the belt driving mode (intermediate vehicle speed) shown in FIG. 2 transitionally.

Figure 3:
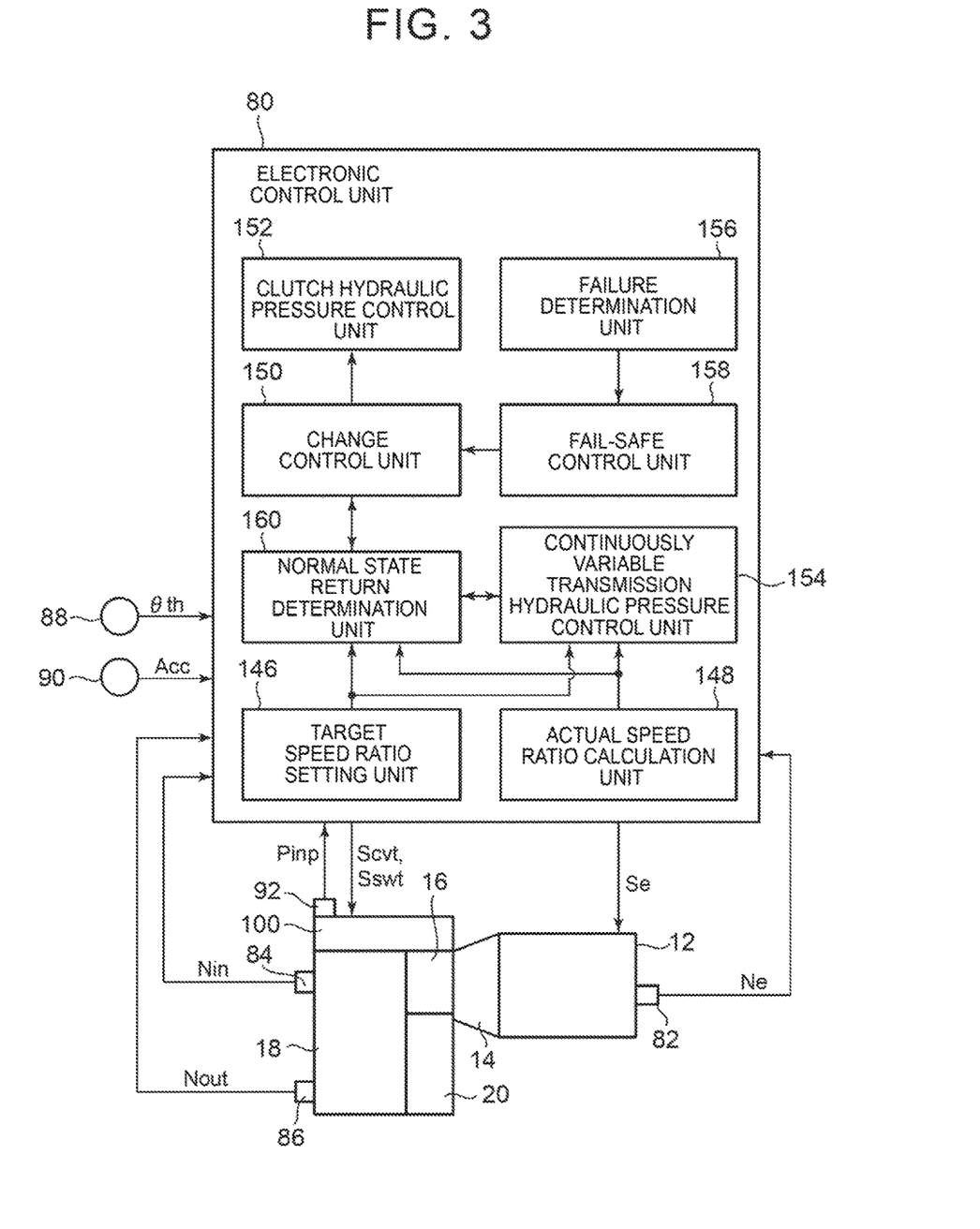
FIG. 3 is a functional block diagram that illustrates input/output lines of an electronic control unit provided in the vehicle power transmission system shown in FIG. 1 and that illustrates a relevant portion of control functions implemented by the electronic control unit.

FIG. 3 is a functional block diagram that illustrates input/output lines of an electronic control unit 80 provided in the power transmission system 10 in order to control the engine 12, the continuously variable transmission 18, and the like, and that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls regarding the power transmission system 10 by executing signal processing in accordance with programs prestored in the ROM while utilizing a temporary storage function of the RAM. For example, the electronic control unit 80 is configured to execute output control over the engine 12, shift control and belt clamping force control over the continuously variable transmission 18, change control for appropriately changing the driving pattern to any one of the gear driving mode using the gear mechanism 20 and the belt driving mode using the continuously variable transmission 18, and the like. Where necessary, the electronic control unit 80 is divided into an electronic control unit for controlling the engine, an electronic control unit for controlling the continuously variable transmission, an electronic control unit for changing the driving pattern, and the like.

Signals detected by various sensors, switch, and the like, provided at portions of the power transmission system 10 are supplied to the electronic control unit 80. For example, a signal indicating a rotation speed (engine rotation speed) Ne of the engine 12, a signal indicating the input shaft rotation speed Nin, a signal indicating the output shaft rotation speed Nout, a signal indicating a throttle opening degree θth of an electronic throttle valve (not shown), a signal indicating an accelerator operation amount Acc, a signal indicating a secondary hydraulic pressure (secondary actual hydraulic pressure) Pd, and the like, are supplied to the electronic control unit 80. The engine rotation speed Ne is detected by an engine rotation speed sensor 82. The input shaft rotation speed Nin is the rotation speed of the input shaft 32 (primary pulley 54) of the continuously variable transmission 18, and is detected by an input shaft rotation speed sensor 84. The output shaft rotation speed Nout is the rotation speed of the output shaft 24, and is detected by an output shaft rotation speed sensor 86. The output shaft rotation speed Nout corresponds to a vehicle speed V. The throttle opening degree θth is detected by a throttle sensor 88. The accelerator operation amount Acc is an operation amount of an accelerator pedal (not shown) as a driver's required acceleration amount, and is detected by an accelerator operation amount sensor 90. The secondary hydraulic pressure Pd is detected by a hydraulic pressure sensor 92, and is supplied to the secondary hydraulic actuator 56c. The electronic control unit 80, for example, where necessary, calculates an actual speed ratio γp Nin/Nout) of the continuously variable transmission 18 based on the output shaft rotation speed Nout that is detected by the output shaft rotation speed sensor 86 and the input shaft rotation speed Nin that is detected by the input shaft rotation speed sensor 84.

Operation commands are configured to be output from the electronic control unit 80 to the portions of the power transmission system 10. For example, an engine output control command signal Se, a hydraulic control command signal Scvt, a hydraulic control command signal Sswt, and the like, are output from the electronic control unit 80. The engine output control command signal Se is used to control the output of the engine 12. The hydraulic control command signal Scvt is used to control hydraulic pressure associated with a shift of the continuously variable transmission 18. The hydraulic control command signal Sswt is used to control the forward/reverse switching device 16 (forward clutch C1, reverse brake B1), the belt driving clutch C2 and the dog clutch D1 associated with a change of the driving pattern of the power transmission system 10. That is, in the present embodiment, the electronic control unit 80 corresponds to a controller for the power transmission system 10. Specifically, a throttle signal, an injection signal, an ignition timing signal, and the like, are output as the engine output control command signal Se. The throttle signal is used to control the open/close of the electronic throttle valve by driving a throttle actuator. The injection signal is used to control the amount of fuel that is injected from a fuel injection device. The ignition timing signal is used to control the ignition timing of the engine 12 by an ignition device. A command signal for driving a speed ratio control linear solenoid valve SLP (see FIG. 4) that regulates a primary hydraulic pressure Pin, a command signal for driving a clamping force control linear solenoid valve SLS (see FIG. 4) that regulates the secondary hydraulic pressure Pd, and the like, are output to a hydraulic control circuit 100 as the hydraulic control command signal Scvt. The hydraulic control circuit 100 is provided in the power transmission system 10. The primary hydraulic pressure Pin is supplied to the primary hydraulic actuator 54c. The secondary hydraulic pressure Pd is supplied to the secondary hydraulic actuator 56c. Command signals, and the like, for respectively driving linear solenoid valves that control hydraulic pressures that are supplied to the forward clutch C1, the reverse brake B1, the belt driving clutch C2 and the synchromesh mechanism S1 are output to the hydraulic control circuit 100 as the hydraulic control command signal Sswt.

Figure 4:
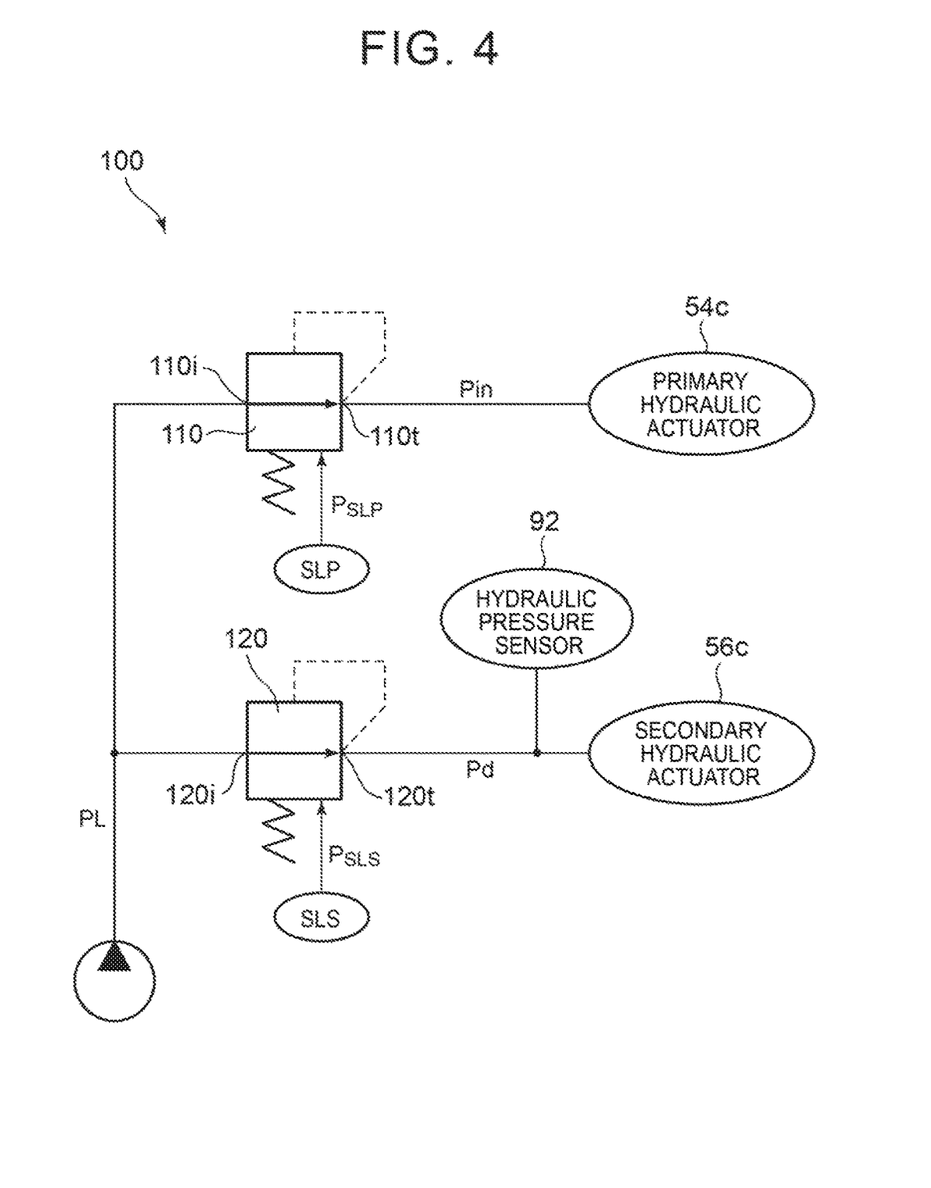
FIG. 4 is a hydraulic circuit diagram that shows a relevant portion regarding speed ratio control and belt clamping force control over a belt-type continuously variable transmission within a hydraulic control circuit provided in the vehicle power transmission system shown in FIG. 1.

FIG. 4 is a hydraulic circuit diagram that shows a relevant portion regarding speed ratio control and belt clamping force control over the continuously variable transmission 18 within the hydraulic control circuit 100. As shown in FIG. 4, the hydraulic control circuit 100 includes the speed ratio control linear solenoid valve SLP, a speed ratio control valve 110, the clamping force control linear solenoid valve SLS, a clamping force control valve 120 and the hydraulic pressure sensor 92. The speed ratio control valve 110 regulates the primary hydraulic pressure Pin in response to an output hydraulic pressure $P_{SLP}$ of the speed ratio control linear solenoid valve SLP. The clamping force control valve regulates the secondary hydraulic pressure Pd in response to an output hydraulic pressure $P_{SLS}$ of the clamping force control linear solenoid valve SLS. The hydraulic pressure sensor 92 detects a hydraulic pressure that is output from an output port 120t of the clamping force control valve 120.

The speed ratio control valve 110 is a pressure control valve, and includes an input port 110i and an output port 110t. A line hydraulic pressure PL is supplied to the input port 110i. The output port 110t outputs an actual primary hydraulic pressure (i.e. primary hydraulic pressure) Pin obtained by regulating the line hydraulic pressure PL. When the output hydraulic pressure $P_{SLP}$ of the speed ratio control linear solenoid valve SLP is controlled in response to a control signal $I_{SLP}$ that is supplied from the electronic control unit 80, the primary hydraulic pressure Pin commensurate with the output hydraulic pressure $P_{SLP}$ is regulated in the speed ratio control valve 110. The primary hydraulic pressure Pin output from the speed ratio control valve 110 is supplied to the primary hydraulic actuator 54c. That is, the primary hydraulic pressure Pin is output from the speed ratio control valve 110 in accordance with the control signal $I_{SLP}$. The groove width of the primary pulley 54 changes in response to the primary hydraulic pressure Pin that is supplied to the primary hydraulic actuator 54c, so the speed ratio γ is adjusted. The line hydraulic pressure PL is regulated to a hydraulic pressure value commensurate with an engine load, and the like, by a primary regulator valve (not shown) by using working hydraulic pressure as a source pressure. The working hydraulic pressure is output (generated) from a mechanical oil pump that is driven by the engine 12 to rotate.

Figure 5A:
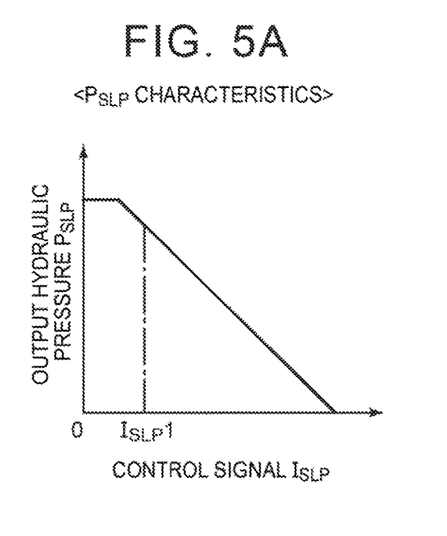
FIG. 5A and FIG. 5B are graphs that illustrate the characteristics of a speed ratio control linear solenoid valve provided in the hydraulic control circuit shown in FIG. 4.
Figure 5B:
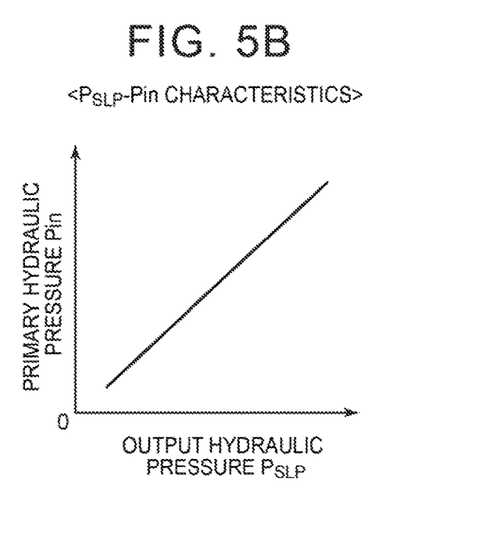

FIG. 5A is a graph that shows the relationship between the control signal $I_{SLP}$ and output hydraulic pressure $P_{SLP}$ of the speed ratio control linear solenoid valve SLP. As shown in FIG. 5A, the output hydraulic pressure $P_{SLP}$ is maximum when the control signal $I_{SLP}$ is around zero, and the output hydraulic pressure $P_{SLP}$ linearly decreases with an increase in the control signal $I_{SLP}$. The output hydraulic pressure $P_{SLP}$ is usually controlled in a region in which the control signal $I_{SLP}$ is larger than a predetermined value $I_{SLP}1$, that is, a region in which the output hydraulic pressure $P_{SLP}$ linearly changes in response to the control signal $I_{SLP}$. FIG. 5B is a graph that shows the relationship between the output hydraulic pressure $P_{SLP}$ and the primary hydraulic pressure Pin. The primary hydraulic pressure Pin is linearly increased in response to the output hydraulic pressure $P_{SLP}$. That is, as the control signal $I_{SLP}$ increases, the primary hydraulic pressure Pin decreases, and the continuously variable transmission 18 is downshifted such that the speed ratio γ increases. As the control signal $I_{SLP}$ reduces, the primary hydraulic pressure Pin increases, and the continuously variable transmission 18 is upshifted such that the speed ratio γ reduces.

The clamping force control valve 120 is a pressure control valve, and includes an input port 120$i$ and an output port 120$t$. The line hydraulic pressure PL is supplied to the input port 120$i$. The output port 120$t$ outputs the secondary hydraulic pressure Pd, regulated from the line hydraulic pressure PL, to the secondary hydraulic actuator 56$c$. When the output hydraulic pressure $P_{SLS}$ of the clamping force control linear solenoid valve SLS is controlled in response to a control signal $I_{SLS}$ that is supplied from the electronic control unit 80, the secondary hydraulic pressure Pd commensurate with the output hydraulic pressure $P_{SLS}$ is regulated in the clamping force control valve 120. That is, the secondary hydraulic pressure Pd is output from the clamping force control valve 120 in accordance with the control signal $I_{SLS}$. When the thus regulated secondary hydraulic pressure Pd is supplied to the secondary hydraulic actuator 56$c$, the belt clamping force of the continuously variable transmission 18 is adjusted in response to the secondary hydraulic pressure Pd.

Figure 6A:
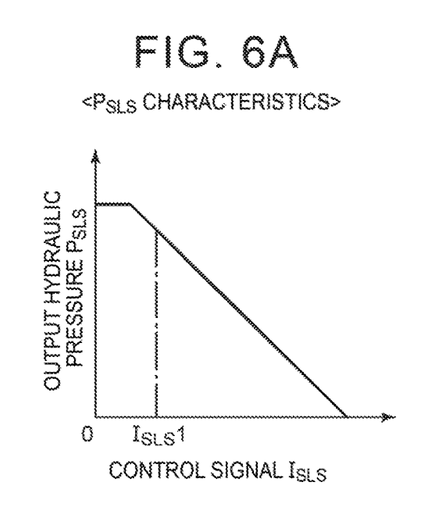
FIG. 6A and FIG. 6B are graphs that illustrate the characteristics of a clamping force control linear solenoid valve provided in the hydraulic control circuit shown in FIG. 4.
Figure 6B:
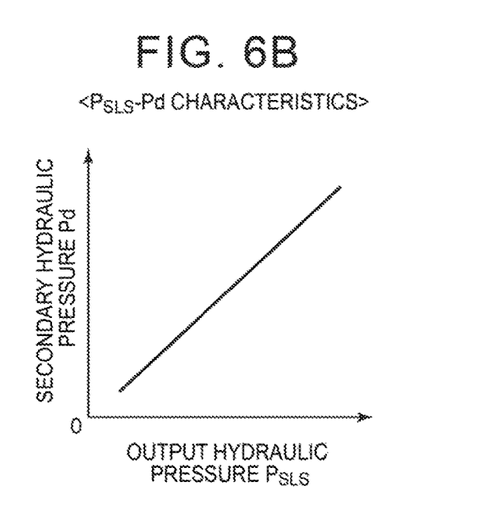

FIG. 6A is a graph that shows the relationship between the control signal $I_{SLS}$ and output hydraulic pressure $P_{SLS}$ of the clamping force control linear solenoid valve SLS. As shown in FIG. 6A, the output hydraulic pressure $P_{SLS}$ is maximum when the control signal $I_{SLS}$ is around zero, and the output hydraulic pressure $P_{SLS}$ linearly decreases with an increase in the control signal $I_{SLS}$. The output hydraulic pressure $P_{SLS}$ is usually controlled in a region in which the control signal $I_{SLS}$ is larger than a predetermined value $I_{SLS}1$, that is, a region in which the output hydraulic pressure $P_{SLS}$ linearly changes in response to the control signal $I_{SLS}$. FIG. 6B is a graph that shows the relationship between the output hydraulic pressure $P_{SLS}$ and the secondary hydraulic pressure Pd. The secondary hydraulic pressure Pd is linearly increased in response to the output hydraulic pressure $P_{SLS}$. That is, as the control signal $I_{SLS}$ increases, the secondary hydraulic pressure Pd decreases, and the belt clamping force is reduced. As the control signal $I_{SLS}$ reduces, the secondary hydraulic pressure Pd increases, and the belt clamping force is increased.

As shown in FIG. 3, the electronic control unit 80 includes a target speed ratio setting unit 146, an actual speed ratio calculation unit 148, a change control unit 150, a clutch hydraulic pressure control unit 152, a continuously variable transmission hydraulic pressure control unit 154, a failure determination unit 156, a fail-safe control unit 158 and a normal state return determination unit 160. The actual speed ratio calculation unit 148 calculates the actual speed ratio γp of the continuously variable transmission 18. Specifically, the actual speed ratio calculation unit 148, where necessary, calculates the actual speed ratio γp (=Nin/Nout) of the continuously variable transmission 18 based on the output shaft rotation speed Nout that is detected by the output shaft rotation speed sensor 86 and the input shaft rotation speed Nin that is detected by the input shaft rotation speed sensor 84.

The change control unit 150 switches between the state where the first transmission path is established and the state where the second transmission path is established in the power transmission system 10 by controlling the engagement states of the forward clutch C1, dog clutch D1, belt driving clutch C2 and reverse brake B1 as the switching mechanism. That is, the change control unit 150 executes change control for changing the driving pattern between the belt driving mode and the gear driving mode based on the state of the vehicle. In the belt driving mode, torque generated by the engine 12 is transmitted to the output shaft 24 via the continuously variable transmission 18, and the like. In the gear driving mode, torque generated by the engine 12 is transmitted to the output shaft 24 via the gear mechanism 20, and the like.

The clutch hydraulic pressure control unit 152 controls the engagement states of the forward clutch C1, dog clutch D1, belt driving clutch C2 and reverse brake B1 via the hydraulic control circuit 100. That is, the clutch hydraulic pressure control unit 152 controls hydraulic pressures that are supplied from the hydraulic control circuit 100 to the hydraulic actuators corresponding to the forward clutch C1, the belt driving clutch C2, and the like, by supplying linear solenoid valves (not shown) with command signals for driving the linear solenoid valves. The linear solenoid valves control hydraulic pressures that are supplied to the hydraulic actuators respectively corresponding to the forward clutch C1, the belt driving clutch C2, and the like.

The sleeve 48 of the synchromesh mechanism S1 is suitably driven in response to a hydraulic pressure that is supplied to a hydraulic actuator (not shown) corresponding to the sleeve 48. That is, the synchromesh mechanism S1 is suitably actuated by a hydraulic pressure that is supplied from the hydraulic control circuit 100. The clutch hydraulic pressure control unit 152 controls the engagement state of the dog clutch D1 via the hydraulic control circuit 100. That is, the clutch hydraulic pressure control unit 152 controls hydraulic pressure that is supplied from the hydraulic control circuit 100 to the hydraulic actuator corresponding to the sleeve 48 by supplying a linear solenoid valve (not shown) with a command signal for driving the linear solenoid valve in order to control hydraulic pressure that is supplied to the hydraulic actuator corresponding to the sleeve 48.

The change control unit 150 determines whether to change the driving pattern in the power transmission system 10 based on the traveling state of the vehicle. For example, a driving region map is determined in advance, and is stored in a storage unit, or the like, in the electronic control unit 80. The driving region map is used to determine the driving pattern based on the relationship between the vehicle speed V and the accelerator operation amount Ace (or the throttle opening degree θth). In this driving region map, a gear driving region in which the gear driving mode should be established is set to a relatively low vehicle speed and low accelerator operation amount (low load traveling) region. A belt driving region in which the belt driving mode should be established is set to a relatively intermediate and high vehicle speed and intermediate and high accelerator operation amount (intermediate and high load traveling) region. The change control unit 150 determines the driving pattern to be established in the power transmission system 10 from the driving region map based on the accelerator operation amount Acc, the output shaft rotation speed Nout corresponding to the vehicle speed V, and the like.

When it is determined to change the driving pattern, the change control unit 150 changes the driving pattern in the power transmission system 10. For example, when the driving pattern in the power transmission system 10 is changed from the gear driving mode to the belt driving mode (high vehicle speed), the change control unit 150 starts changing the engaged states of the forward clutch C1 and belt driving clutch C2. Specifically, the change control unit 150 executes engagement changing control (clutch-to-clutch control) for releasing the forward clutch C1 and engaging the belt driving clutch C2 with the use of the clutch hydraulic pressure control unit 152. This state corresponds to the belt driving mode (intermediate vehicle speed) shown in FIG. 2. Subsequently, the change control unit 150 causes the clutch hydraulic pressure control unit 152 to release (disconnect) the dog clutch D1. That is, the change control unit 150 outputs a command to disconnect the connected dog clutch D1 by moving the sleeve 48 in the synchromesh mechanism S1.

When the driving pattern in the power transmission system 10 is changed from the belt driving mode (high vehicle speed) to the gear driving mode, the change control unit 150 initially causes the clutch hydraulic pressure control unit 152 to engage (connect) the dog clutch D1. This state corresponds to the belt driving mode (intermediate vehicle speed) shown in FIG. 2. Subsequently, the change control unit 150 starts changing the engaged states of the forward clutch C1 and belt driving clutch C2. Specifically, the change control unit 150 executes engagement changing control (clutch-to-clutch control) for engaging the forward clutch C1 and releasing the belt driving clutch C2 with the use of the clutch hydraulic pressure control unit 152.

Figure 7:
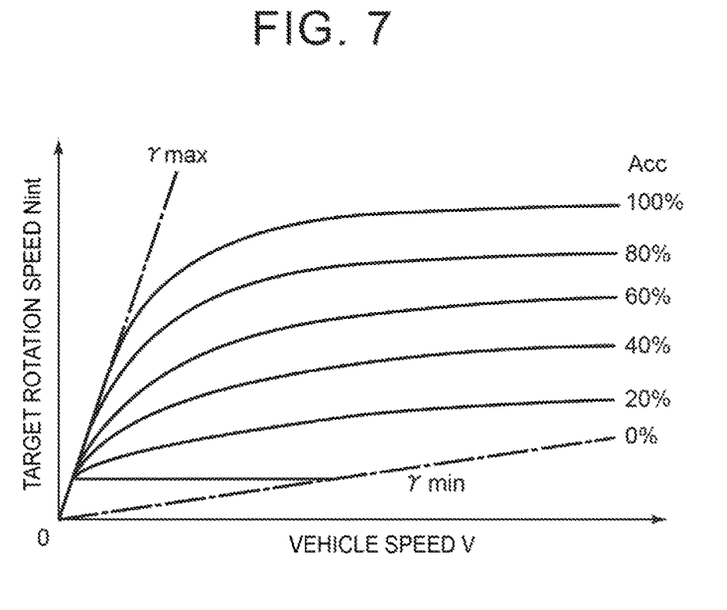
FIG. 7 is a view that shows an example of a shift map that is used at the time of obtaining a target rotation speed in speed ratio control over the belt-type continuously variable transmission shown in FIG. 1.

The continuously variable transmission hydraulic pressure control unit 154 controls hydraulic pressures that are supplied to the continuously variable transmission 18. That is, the continuously variable transmission hydraulic pressure control unit 154 controls the primary hydraulic pressure Pin that is supplied to the primary hydraulic actuator 54c and the secondary hydraulic pressure Pd that is supplied to the secondary hydraulic actuator 56c. The target speed ratio setting unit 146 sets a target speed ratio $\gamma^*$ of the continuously variable transmission 18. Specifically, the target speed ratio setting unit 146 calculates a target rotation speed Nint of the input shaft rotation speed Nin in the continuously variable transmission 18 from, for example, a map shown in FIG. 7 based on the vehicle speed V, the accelerator operation amount Acc, and the like. The map shown in FIG. 7 is suitably determined such that, as the accelerator operation amount Acc, that is, a driver's required output amount, increases or as the vehicle speed V decreases, the ratio of the target rotation speed Nint to the vehicle speed V increases and, as a result, the speed ratio $\gamma$ increases. The continuously variable transmission hydraulic pressure control unit 154 executes feedback control over the control signal $I_{SLP}$ of the speed ratio control linear solenoid valve SLP within a region above the predetermined value $I_{SLS}1$ such that an actual input shaft rotation speed Nin coincides with the target rotation speed Nint. Because the speed ratio $\gamma$ of the continuously variable transmission 18 is Input shaft rotation speed Nin/Output shaft rotation speed Nout and the output shaft rotation speed Nout is constant within a short period of time in correspondence with the vehicle speed V, the target rotation speed Nint corresponds to the target speed ratio $\gamma^*$ based on the vehicle speed V at that time. When the input shaft rotation speed Nin is controlled so as to coincide with the target rotation speed Nint, the speed ratio $\gamma$ is substantially controlled so as to coincide with the target speed ratio $\gamma^*$.

The continuously variable transmission hydraulic pressure control unit 154 controls the speed ratio $\gamma$ of the continuously variable transmission 18 in the gear driving mode, that is, in a state where torque is transmitted through the second transmission path. Suitably, in the gear driving mode, the target speed ratio $\gamma^*$ of the continuously variable transmission 18 is fixed to a maximum value (lowest speed stage). Alternatively, the target speed ratio $\gamma^*$ is fixed to a prescribed speed ratio smaller than the maximum value (on a higher vehicle speed side than the lowest speed stage). For example, the target speed ratio $\gamma^*$ of the continuously variable transmission 18 is fixed to a minimum value (maximum speed stage).

Figure 8:
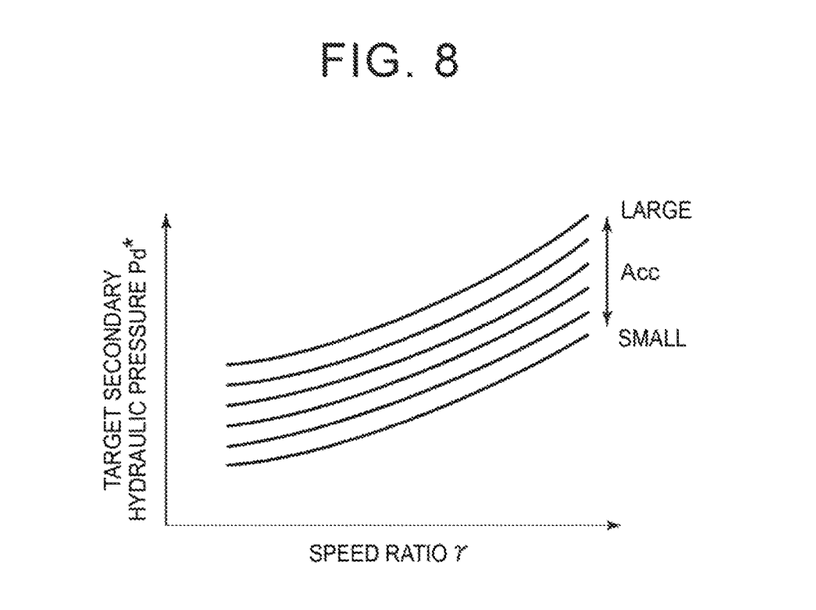
FIG. 8 is a view that shows an example of a hydraulic pressure map that is used at the time of obtaining a target secondary hydraulic pressure in belt clamping force control over the belt-type continuously variable transmission shown in FIG. 1.

The continuously variable transmission hydraulic pressure control unit 154 calculates a target secondary hydraulic pressure Pd* from, for example, the relationship shown in FIG. 8 based on the accelerator operation amount Acc and the speed ratio $\gamma$. The target secondary hydraulic pressure Pd* is a target value of the secondary hydraulic pressure Pd that is supplied to the secondary hydraulic actuator 56c. The map shown in FIG. 8 is a map in which the target secondary hydraulic pressure Pd* that achieves the secondary hydraulic pressure Pd as low as possible for the purpose of improvement in fuel economy within a range in which no belt slip occurs is determined in advance by using the accelerator operation amount Acc and the speed ratio $\gamma$, corresponding to a transmission torque, as parameters. The map shown in FIG. 8 is suitably determined such that, as the accelerator operation amount Acc, that is, the driver's required output amount, increases or as the speed ratio $\gamma$ increases, the target secondary hydraulic pressure Pd* increases and, as a result, the belt clamping force increases. The continuously variable transmission hydraulic pressure control unit 154 controls the control signal $I_{SLS}$ of the clamping force control linear solenoid valve SLS within a region above the predetermined value $I_{SLS}1$ such that the actual secondary hydraulic pressure Pd coincides with the target secondary hydraulic pressure Pd*. A secondary hydraulic pressure map that is the relationship between the secondary hydraulic pressure Pd and the control signal $I_{SLS}$ as illustrated in FIG. 6A and FIG. 6B is determined and stored in advance. The control signal $I_{SLS}$ is a control command value for determining the secondary hydraulic pressure Pd. In the belt clamping force control that is control over the secondary hydraulic pressure Pd, the continuously variable transmission hydraulic pressure control unit 154 outputs the control signal $I_{SLS}$ that is regulated to the secondary hydraulic pressure Pd corresponding to the control signal $I_{SLS}$ in accordance with the secondary hydraulic pressure map. The secondary hydraulic pressure Pd corresponds to the belt clamping force, so the secondary hydraulic pressure Pd may be controlled by the use of a map of a target belt clamping force instead of the target secondary hydraulic pressure Pd*.

The failure determination unit 156 determines whether there is a failure in the hydraulic pressure output device that outputs the primary hydraulic pressure Pin to the primary pulley 54. In the present embodiment, the speed ratio control linear solenoid valve SLP, the speed ratio control valve 110, and the like, correspond to a hydraulic pressure output device that outputs the primary hydraulic pressure Pin to the primary pulley 54. That is, the hydraulic pressure output device is, in other words, configured to control the primary hydraulic pressure Pin that is supplied to the primary pulley 54. For example, when a shift lever (not shown) is operated to a drive position, such as D position, the failure determination unit 156 determines whether there is a failure in the speed ratio control linear solenoid valve SLP. Suitably, the failure determination unit 156 determines whether there is an ON failure in the speed ratio control linear solenoid valve SLP. The ON failure of the speed ratio control linear solenoid valve SLP means a state where the output hydraulic pressure $P_{SLP}$ lower than a prescribed value (for example, a minimum value) is output from the speed ratio control linear solenoid valve SLP or a state where the output hydraulic pressure $P_{SLP}$ is not output ($P_{SLP}=0$) irrespective of the control signal $I_{SLP}$ that is supplied to the speed ratio control linear solenoid valve SLP. The failure determination unit 156 may determine whether there is an OFF failure in the speed ratio control linear solenoid valve SLP. The OFF failure of the speed ratio control linear solenoid valve SLP means a state where the output hydraulic pressure $P_{SLP}$ higher than or equal to a prescribed value (for example, a maximum value) is output from the speed ratio control linear solenoid valve SLP irrespective of the control signal $I_{SLP}$ that is supplied to the speed ratio control linear solenoid valve SLP.

The failure determination unit 156 suitably determines whether there is a drain failure or an open failure in the speed ratio control valve 110. The drain failure of the speed ratio control valve 110 means that hydraulic pressure control over the primary hydraulic pressure Pin is disabled and, as a result, the primary hydraulic pressure Pin decreases to or below a predetermined lower limit value at which it is not possible to appropriately control the belt clamping force or the speed ratio γ. The drain failure corresponds to a primary pressure leakage failure. The drain failure of the speed ratio control valve 110 includes the case where the output hydraulic pressure $P_{SLP}$ of the speed ratio control linear solenoid valve SLP becomes lower than a prescribed value (for example, $P_{SLP}=0$) because of mechanical or electrical factors, or the like, and, as a result, the primary hydraulic pressure Pin becomes lower than or equal to the predetermined lower limit value. That is, the drain failure of the speed ratio control valve 110 includes the case caused by the ON failure of the speed ratio control linear solenoid valve SLP (a failure that the control signal $I_{SLP}$ becomes maximum). The open failure of the speed ratio control valve 110 means that the primary hydraulic pressure Pin increases to a value higher than or equal to a predetermined upper limit value at which hydraulic pressure control over the primary hydraulic pressure Pin is disabled and it is not possible to appropriately control the belt clamping force or the speed ratio γ. The open failure of the speed ratio control valve 110 includes the case where the output hydraulic pressure $P_{SLP}$ of the speed ratio control linear solenoid valve SLP becomes higher than or equal to a prescribed value (for example, maximum value) because of mechanical or electrical factors, or the like, and, as a result, the primary hydraulic pressure Pin that is output from the speed ratio control valve 110 becomes higher than or equal to the predetermined upper limit value. That is, the open failure of the speed ratio control valve 110 includes the case caused by the OFF failure of the speed ratio control linear solenoid valve SLP (a failure that the control signal $I_{SLP}$ becomes minimum).

The failure determination unit 156 specifically determines whether there is a drain failure or an open failure in the speed ratio control valve 110 based on the relationship between a change in the primary hydraulic pressure Pin that is output from the speed ratio control valve 110 and a change in the control signal $I_{SLP}$. The primary hydraulic pressure Pin is estimated by a known method based on an actual secondary hydraulic pressure (i.e. secondary hydraulic pressure) Pd that is detected by the hydraulic pressure sensor 92. A hydraulic pressure sensor that detects the primary hydraulic pressure Pin may be provided in the hydraulic control circuit 100. For example, when a change in the control signal $I_{SLP}$ is a reducing direction and a change in the primary hydraulic pressure Pin is a reducing direction, the failure determination unit 156 determines that there is a drain failure in the speed ratio control valve 110. When a change in the control signal $I_{SLP}$ is an increasing direction and a change in the primary hydraulic pressure Pin is an increasing direction, the failure determination unit 156 determines that there is an open failure in the speed ratio control valve 110. Suitably, when it is determined that there is a drain failure in the speed ratio control valve 110, the failure determination unit 156 determines (estimates) that there is an ON failure in the speed ratio control linear solenoid valve SLP. When it is determined that there is an open failure in the speed ratio control valve 110, the failure determination unit 156 determines (estimates) that there is an OFF failure in the speed ratio control linear solenoid valve SLP.

When the failure determination unit 156 determines that there is a failure in the hydraulic pressure output device, the normal state return determination unit 160 determines whether the hydraulic pressure output device has returned to a normal state. In the present embodiment, the normal state of the hydraulic pressure output device means a state where, for the speed ratio control linear solenoid valve SLP, the appropriate output hydraulic pressure $P_{SLP}$ (for example, the hydraulic pressure $P_{SLP}$ based on the characteristics shown in FIG. 5A) is output from the speed ratio control linear solenoid valve SLP in response to the control signal $I_{SLP}$ that is supplied to the speed ratio control linear solenoid valve SLP. The normal state of the hydraulic pressure output device also means a state where, for the speed ratio control valve 110, the appropriate primary hydraulic pressure Pin (for example, the hydraulic pressure Pin based on the characteristics shown in FIG. 5A and FIG. 5B) is output from the speed ratio control valve 110 in response to the control signal $I_{SLP}$ that is supplied to the speed ratio control linear solenoid valve SLP.

When the failure determination unit 156 determines that there is a failure in the hydraulic pressure output device, the normal state return determination unit 160 causes the change control unit 150 to establish the state where torque is transmitted through the second transmission path. That is, the normal state return determination unit 160 establishes the state where torque is transmitted via the gear mechanism 20. In addition, the normal state return determination unit 160 prohibits switching to the state where torque is transmitted through the first transmission path. That is, the normal state return determination unit 160 prohibits switching to the state where torque is transmitted via the continuously variable transmission 18. Suitably, when the failure determination unit 156 determines that there is a failure in the hydraulic pressure output device, the normal state return determination unit 160 establishes a neutral state in the power transmission system 10 by once releasing any engagement devices, such as the forward clutch C1 and the belt driving clutch C2, via the clutch hydraulic pressure control unit 152. Thus, the vehicle speed V decreases. At the time when the vehicle speed V becomes lower than or equal to a prescribed value Vbo, the normal state return determination unit 160 causes the change control unit 150 to establish the state where torque is transmitted via the gear mechanism 20, and prohibits switching to the state where torque is transmitted via the continuously variable transmission 18. In the present embodiment, suitably, the prescribed value Vbo is a vehicle speed higher than a vehicle speed that is used as a criterion to determine whether to change the driving pattern from the belt driving mode to the gear driving mode during normal times, that is, when it is not determined that there is a failure in the hydraulic pressure output device.

In a state where torque is transmitted via the gear mechanism 20 is established and switching to the state where torque is transmitted via the continuously variable transmission 18 is prohibited, the normal state return determination unit 160 determines whether the hydraulic pressure output device has returned to the normal state. Suitably, the normal state return determination unit 160 determines whether the speed ratio control linear solenoid valve SLP has returned to the normal state. Specifically, by comparing the target speed ratio $\gamma^*$ and actual speed ratio $\gamma p$ (=Input shaft rotation speed Nin/Output shaft rotation speed Nout) of the continuously variable transmission 18 with each other, the normal state return determination unit 160 determines whether the hydraulic pressure output device has returned to the normal state.

In a mode in which the target speed ratio $\gamma^*$ of the continuously variable transmission 18 is fixed to the maximum value (lowest speed stage) in the gear driving mode, when there occurs an ON failure in the speed ratio control linear solenoid valve SLP, the actual speed ratio $\gamma p$ of the continuously variable transmission 18 becomes a maximum value (lowest speed). In this case, the normal state return determination unit 160 suitably changes the target speed ratio $\gamma^*$ of the continuously variable transmission 18 to an upshift side (that is, a side to which the speed ratio $\gamma$ reduces) and then compares the target speed ratio $\gamma^*$ with the actual speed ratio $\gamma p$, thus determining whether the speed ratio control linear solenoid valve SLP has returned to the normal state. For example, when the actual speed ratio $\gamma p$ changes to an upshift side in response to a change of the target speed ratio $\gamma^*$ to the upshift side, the normal state return determination unit 160 determines that the speed ratio control linear solenoid valve SLP has returned to the normal state. In other words, after the target speed ratio $\gamma^*$ is changed to the upshift side, when the actual speed ratio $\gamma p$ has changed so as to substantially coincide with the target speed ratio $\gamma^*$, the normal state return determination unit 160 determines that the speed ratio control linear solenoid valve SLP has returned to the normal state.

In a mode in which the target speed ratio $\gamma^*$ of the continuously variable transmission 18 is fixed to the maximum value (lowest speed stage) in the gear driving mode, when there occurs an OFF failure in the speed ratio control linear solenoid valve SLP, the actual speed ratio $\gamma p$ of the continuously variable transmission 18 becomes a minimum value (highest speed stage). In this case, by comparing the target speed ratio $\gamma^*$ and actual speed ratio $\gamma p$ of the continuously variable transmission 18 with each other, the normal state return determination unit 160 determines whether the hydraulic pressure output device has returned to the normal state.

In a mode in which the target speed ratio $\gamma^*$ of the continuously variable transmission 18 is fixed to the minimum value (highest speed stage) in the gear driving mode, when there occurs an ON failure in the speed ratio control linear solenoid valve SLP, the actual speed ratio $\gamma p$ of the continuously variable transmission 18 becomes the maximum value (lowest speed stage). In this case, by comparing the target speed ratio $\gamma^*$ and actual speed ratio $\gamma p$ of the continuously variable transmission 18 with each other, the normal state return determination unit 160 determines whether the hydraulic pressure output device has returned to the normal state.

In a mode in which the target speed ratio $\gamma^*$ of the continuously variable transmission 18 is fixed to the minimum value (highest speed stage) in the gear driving mode, when there occurs an OFF failure in the speed ratio control linear solenoid valve SLP, the actual speed ratio $\gamma p$ of the continuously variable transmission 18 becomes the minimum value (highest speed stage). In this case, the normal state return determination unit 160 changes the target speed ratio $\gamma^*$ of the continuously variable transmission 18 to a downshift side (that is, a side to which the speed ratio $\gamma$ increases) and then compares the target speed ratio $\gamma^*$ with the actual speed ratio $\gamma p$, thus determining whether the speed ratio control linear solenoid valve SLP has returned to the normal state. For example, when the actual speed ratio $\gamma p$ changes to a downshift side in response to a change of the target speed ratio to the downshift side, the normal state return determination unit 160 determines that the speed ratio control linear solenoid valve SLP has returned to the normal state. In other words, after the target speed ratio $\gamma^*$ is changed to the downshift side, when the actual speed ratio $\gamma p$ has changed so as to substantially coincide with the target speed ratio $\gamma^*$, the normal state return determination unit 160 determines that the speed ratio control linear solenoid valve SLP has returned to the normal state.

After the normal state return determination unit 160 determines that the speed ratio control linear solenoid valve SLP has returned to the normal state, when it is determined that the traveling state of the vehicle falls within the normal gear driving region based on the vehicle speed V and the accelerator operation amount Acc, the change control unit 150 cancels prohibition of changing the driving pattern to the belt driving mode. The state where the traveling state of the vehicle falls within the normal gear driving region corresponds to a traveling state where, when it is not determined that there is a failure in the hydraulic pressure output device, it is determined that the state where torque is transmitted via the gear mechanism 20 (second transmission path) should be established based on the vehicle speed V and the accelerator operation amount Ace. As described above, the prescribed value Vbo is suitably a vehicle speed higher than a vehicle speed that is used as a criterion to determine whether to change the driving pattern from the belt driving mode to the gear driving mode during normal times. Therefore, it is presumable that the vehicle speed V at the time when it is determined that the speed ratio control linear solenoid valve SLP has returned to the normal state is a vehicle speed higher than the normal gear driving region (a vehicle speed that falls outside the gear driving region and falls within the belt driving region). Therefore, after it is determined that the speed ratio control linear solenoid valve SLP has returned to the normal state, when changing the driving pattern to the belt driving mode is permitted without carrying out any determination, there is a concern that the driving pattern is changed to the belt driving mode immediately and, as a result, a driver experiences a feeling of strangeness. With the above-described control, by cancelling prohibition of changing the driving pattern to the belt driving mode when it is determined that the traveling state of the vehicle falls within the normal gear driving region (prohibition of changing the driving pattern to the belt driving mode is maintained when it is determined that the traveling state of the vehicle falls within the normal belt driving region), it is possible to suitably suppress a feeling of strangeness experienced by the driver.

Figure 9:
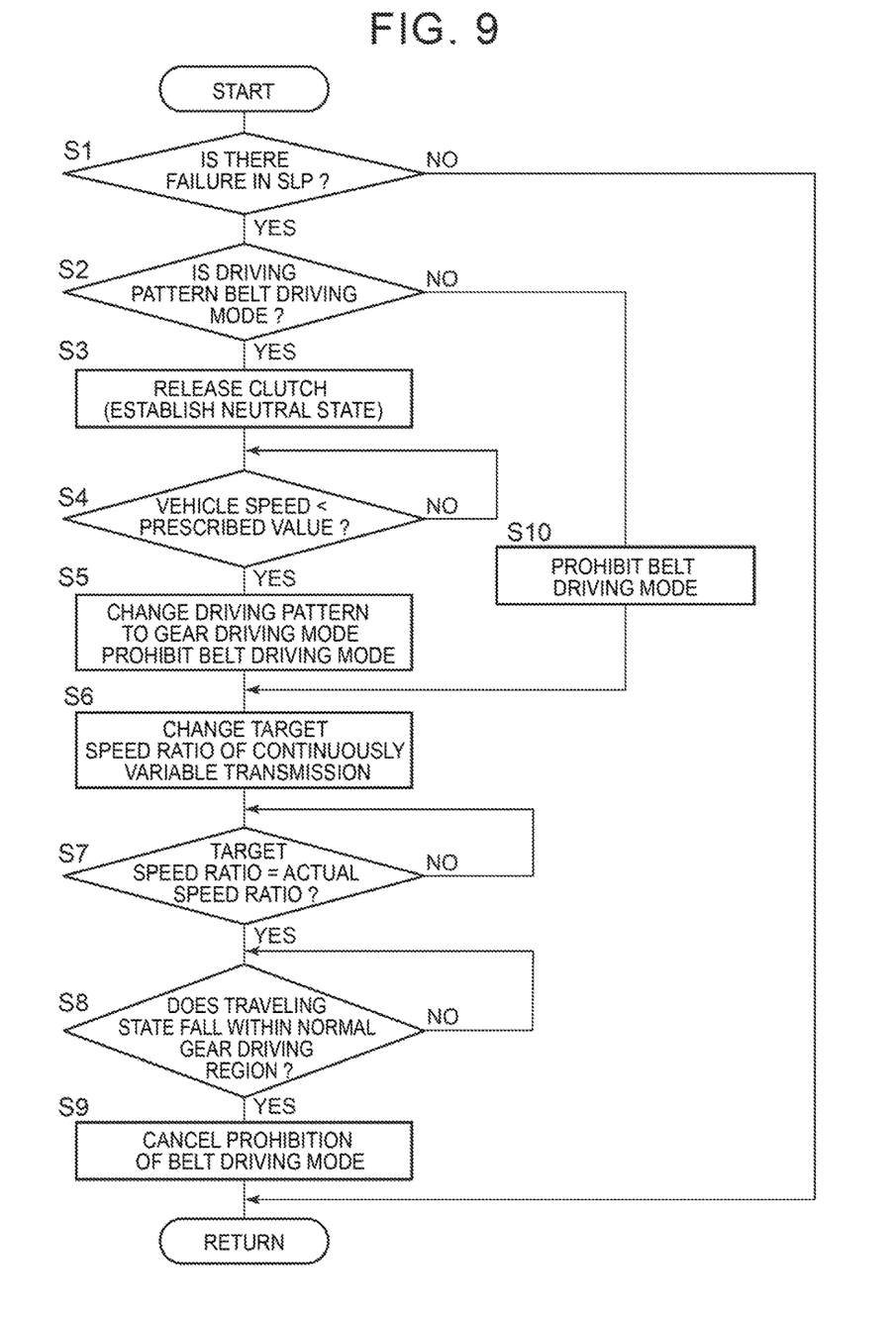
FIG. 9 is a flowchart that illustrates a relevant portion of an example of control according to an embodiment, which is executed by the electronic control unit provided in the vehicle power transmission system shown in FIG. 1.

FIG. 9 is a flowchart that illustrates a relevant portion of an example of control according to the present embodiment, which is executed by the electronic control unit 80. The flowchart is repeatedly executed.

Initially, in step (hereinafter, step is omitted) S1, it is determined whether there is a failure (suitably, ON failure) in the speed ratio control linear solenoid valve SLP. When negative determination is made in S1, the routine is ended. When affirmative determination is made in S1, it is determined in S2 whether the driving pattern is the belt driving mode, that is, whether the state where torque is transmitted via the continuously variable transmission 18 is established in the power transmission system 10. When negative determination is made in S1, that is, when it is determined that the state where torque is transmitted via the gear mechanism 20 is established in the power transmission system 10, switching to the state where torque is transmitted via the continuously variable transmission 18 is prohibited, that is, changing the driving pattern to the belt driving mode, is prohibited, in S10, and then the process from S6 is executed. When affirmative determination is made in S2, the engagement devices, such as the belt driving clutch C2, are released and the neutral state is established in the power transmission system 10 in S3. When there is an OFF failure in the speed ratio control linear solenoid valve SLP, the process of S3 does not need to be executed.

Subsequently, in S4, it is determined whether the vehicle speed V is lower than the prescribed value Vbo. When negative determination is made in S4, determination of S4 is repeated and the process is on standby. When affirmative determination is made in S4, the power transmission state is switched to the state where torque is transmitted via the gear mechanism 20, that is, the driving pattern is changed to the gear driving mode, and changing the driving pattern to the belt driving mode is prohibited in S5. Subsequently, in S6, the target speed ratio γ* of the continuously variable transmission 18 is changed to the upshift side or the downshift side.

Subsequently, in S7, the actual speed ratio γp (=Nin/Nout) of the continuously variable transmission 18 is calculated, and it is determined whether the target speed ratio γ* substantially coincides with the calculated actual speed ratio γp. When negative determination is made in S7, determination of S7 is repeated and the process is on standby. When affirmative determination is made in S7, it is determined in S8 whether the traveling state of the vehicle falls within the normal gear driving region. When negative determination is made in S8, determination of S8 is repeated and the process is on standby. When affirmative determination is made in S8, prohibition of switching to the state where torque is transmitted via the continuously variable transmission 18, that is, prohibition of changing the driving pattern to the belt driving mode, is cancelled in S9, after which the routine is ended.

In the above-described control, S6 corresponds to the operation of the target speed ratio setting unit 146, S7 corresponds to the operation of the actual speed ratio calculation unit 148, S5, S9 and S10 correspond to the operation of the change control unit 150, S3 and S5 correspond to the operation of the clutch hydraulic pressure control unit 152, S6 corresponds to the operation of the continuously variable transmission hydraulic pressure control unit 154, S1 corresponds to the operation of the failure determination unit 156, S3 corresponds to the operation of the fail-safe control unit 158, and S7 corresponds to the operation of the normal state return determination unit 160.

According to the present embodiment, the actual speed ratio calculation unit 148 (S7) that calculates the actual speed ratio γp in the belt-type continuously variable transmission 18, the target speed ratio setting unit 146 (S6) that sets the target speed ratio γ* of the belt-type continuously variable transmission 18, the speed ratio control linear solenoid valve SLP, or the like, that serves as the hydraulic pressure output device and that controls hydraulic pressure that is output to the primary pulley 54 that is the input-side sheave based on the target speed ratio γ*, and the normal state return determination unit 160 (S7) that, when there is a failure in the hydraulic pressure output device, establishes a state where torque is transmitted through the second transmission path and, in this state, determines whether the hydraulic pressure output device has returned to the normal state by comparing the target speed ratio γ* and actual speed ratio γp of the belt-type continuously variable transmission 18 with each other are provided. Therefore, it is possible to determine whether the hydraulic pressure output device has returned to the normal state, and the determination is carried out in a state where torque is transmitted through the second transmission path, so, even when torque fluctuations occur as a result of a shift of the belt-type continuously variable transmission 18, torque is not transmitted to an output side through the first transmission path. Thus, it is possible to suppress a feeling of strangeness that is experienced by the driver. That is, it is possible to provide the electronic control unit 80 for the power transmission system 10, which suppresses a feeling of strangeness that is experienced by the driver at the time of a return from a fail-safe state.

When there is a failure in the speed ratio control linear solenoid valve SLP, or the like, the state where torque is transmitted through the second transmission path is established, and, in this state, it is determined whether the speed ratio control linear solenoid valve SLP, or the like, has returned to the normal state by changing the target speed ratio γ* of the continuously variable transmission 18 and then comparing the target speed ratio γ* with the actual speed ratio γp. Therefore, when the speed ratio control linear solenoid valve SLP, or the like, has returned to the normal state, it is possible to suppress a feeling of strangeness that is experienced by the driver due to a shift of the continuously variable transmission 18.

When there is a failure in the speed ratio control linear solenoid valve SLP, or the like, the normal state return determination unit 160 establishes the state where torque is transmitted through the second transmission path, and prohibits switching from this state to the state where torque is transmitted through the first transmission path. Therefore, it is possible to suppress frequent occurrence of switching between the state where torque is transmitted through the first transmission path and the state where torque is transmitted through the second transmission path, so it is possible to further suitably suppress a feeling of strangeness that is experienced by the driver.

After it is determined that the speed ratio control linear solenoid valve SLP, or the like, has returned to the normal state, when it is determined that the traveling state of the vehicle is a traveling state where the state where torque is transmitted through the second transmission path should be established, the normal state return determination unit 160 cancels prohibition of switching from the state where torque is transmitted through the second transmission path to the state where torque is transmitted through the first transmission path. Because the state where torque is transmitted through the second transmission path is established at a vehicle speed higher than the normal gear driving region, there is a concern that the power transmission state is switched to the state where torque is transmitted through the first transmission path immediately after the speed ratio control linear solenoid valve SLP, or the like, has returned to the normal state and, as a result, the driver experiences a feeling of strangeness. Therefore, by cancelling prohibition of switching to the state where torque is transmitted through the first transmission path on the condition that the traveling state of the vehicle falls within the normal gear driving region, it is possible to further suitably suppress a feeling of strangeness that is experienced by the driver.

When it is determined that there is a failure in the speed ratio control linear solenoid valve SLP, or the like, the normal state return determination unit 160 establishes the neutral state in the power transmission system 10, and establishes the state where torque is transmitted through the second transmission path at the time when the vehicle speed V becomes lower than or equal to the prescribed value Vbo. If the power transmission state is switched to the state where torque is transmitted through the second transmission path at a relatively high vehicle speed, rapid deceleration occurs in the vehicle. By establishing the neutral state in the power transmission system 10, occurrence of rapid deceleration is suppressed, so it is possible to further suitably suppress a feeling of strangeness that is experienced by the driver.

The prescribed value Vbo is a vehicle speed higher than a vehicle speed that is used as a criterion to determine whether to switch from the state where torque is transmitted through the first transmission path to the state where torque is transmitted through the second transmission path in the case where it is not determined that there is a failure in the speed ratio control linear solenoid valve SLP, or the like. Therefore, by determining whether to switch to the state where torque is transmitted through the second transmission path based on the vehicle speed higher than the vehicle speed that is used as a criterion to determine the switching, it is possible to promptly establish the state where torque is transmitted through the second transmission path, so it is possible to quickly shift into retreat traveling.

The embodiment of the invention is described in detail with reference to the accompanying drawings; however, the invention is not limited to the embodiment. The invention encompasses various modifications without departing from the spirit of the invention.

What is claimed is:

1. A controller for a vehicle power transmission system, the vehicle power transmission system including: a gear mechanism, a belt-type continuously variable transmission and a switching mechanism, the gear mechanism and the belt-type continuously variable transmission being provided in parallel with each other in power transmission paths between an input shaft and an output shaft, the belt-type continuously variable transmission including an input-side sheave and an output-side sheave, the switching mechanism being configured to selectively establish any one of a first transmission path of the power transmission paths and a second transmission path of the power transmission paths, the first transmission path being a path through which torque input from the input shaft is transmitted to the output shaft via the belt-type continuously variable transmission, the second transmission path being a path through which torque input from the input shaft is transmitted to the output shaft via the gear mechanism, the controller comprising:
    one or more processors programmed to
        calculate an actual speed ratio in the belt-type continuously variable transmission, and
        set a target speed ratio of the belt-type continuously variable transmission; and
    a hydraulic pressure output device configured to control hydraulic pressure that is output to the input-side sheave based on the target speed ratio, wherein
    the one or more processors are further programmed to, when there is a failure in the hydraulic pressure output device, establish a state where torque is transmitted through the second transmission path, and determine whether the hydraulic pressure output device has returned to a normal state by comparing the target speed ratio and actual speed ratio of the belt-type continuously variable transmission with each other in the state where torque is transmitted through the second transmission path.

2. The controller according to claim 1, wherein
    the one or more processors are further programmed to, when there is the failure in the hydraulic pressure output device,
    (i) establish the state where torque is transmitted through the second transmission path, and
    (ii) determine whether the hydraulic pressure output device has returned to the normal state by changing the target speed ratio of the belt-type continuously variable transmission in the state where torque is transmitted through the second transmission path and then comparing the target speed ratio with the actual speed ratio.

3. The controller according to claim 1, wherein
    the one or more processors are further programmed to, when there is the failure in the hydraulic pressure output device,
    (i) establish the state where torque is transmitted through the second transmission path, and
    (ii) prohibit switching from the state where torque is transmitted through the second transmission path to a state where torque is transmitted through the first transmission path.

4. The controller according to claim 3, wherein
    the one or more processors are further programmed to, after it is determined that the hydraulic pressure output device has returned to the normal state, when it is determined that a traveling state is a state where the state where torque is transmitted through the second transmission path should be established, cancel prohibition of switching from the state where torque is transmitted through the second transmission path to the state where torque is transmitted through the first transmission path.

5. The controller according to claim 1, wherein
    the one or more processors are further programmed to, when it is determined that there is dice failure in the hydraulic pressure output device,
    (i) establish a neutral state in the vehicle power transmission system, and
    (ii) at the time when a vehicle speed becomes lower than or equal to a prescribed value, establish the state where torque is transmitted through the second transmission path.

6. The controller according to claim 5, wherein
the prescribed value is a vehicle speed higher than a vehicle speed that is used as a criterion to switch from a state where torque is transmitted through the first transmission path to the state where torque is transmitted through the second transmission path in the case where it is not determined that there is the failure in the hydraulic pressure output device.

* * * * *